United States Patent
Gupta et al.

(10) Patent No.: US 11,237,730 B2
(45) Date of Patent: Feb. 1, 2022

(54) FAVORED CACHE STATUS FOR SELECTED VOLUMES WITHIN A STORAGE SYSTEM

(71) Applicant: International Business Machines Corporation, Armonk, NY (US)

(72) Inventors: Lokesh M. Gupta, Tucson, AZ (US); Beth A. Peterson, Tucson, AZ (US); Kevin J. Ash, Tucson, AZ (US); Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/409,829

(22) Filed: May 12, 2019

(65) Prior Publication Data

US 2020/0356278 A1 Nov. 12, 2020

(51) Int. Cl.
*G06F 3/06* (2006.01)
*G06F 12/0817* (2016.01)
*G06F 12/0871* (2016.01)

(52) U.S. Cl.
CPC .......... *G06F 3/0611* (2013.01); *G06F 3/0665* (2013.01); *G06F 12/0828* (2013.01); *G06F 12/0871* (2013.01); *G06F 3/0679* (2013.01)

(58) Field of Classification Search
CPC .. G06F 3/0611; G06F 3/0665; G06F 12/0871; G06F 12/0828; G06F 3/0679
See application file for complete search history.

(56) References Cited

U.S. PATENT DOCUMENTS

| 5,043,885 A | | 8/1991 | Robinson |
| 5,493,667 A | * | 2/1996 | Huck ................... G06F 12/126 |
| | | | 711/125 |
| 5,594,885 A | | 1/1997 | Lautzenheiser |

(Continued)

FOREIGN PATENT DOCUMENTS

| CN | 1564138 A | 1/2005 |
| CN | 105447171 A | 3/2016 |

(Continued)

OTHER PUBLICATIONS

List of IBM Patents or Patent Applications Treated as Related.

(Continued)

*Primary Examiner* — Tasnima Matin
(74) *Attorney, Agent, or Firm* — Nelson IP; Daniel P. Nelson

(57) ABSTRACT

A method for improving cache hit ratios for selected volumes within a storage system is disclosed. In one embodiment, such a method includes monitoring I/O to multiple volumes residing on a storage system. The storage system includes a cache to store data associated with the volumes. The method determines, from the I/O, which particular volumes of the multiple volumes would benefit the most if provided favored status in the cache. The favored status provides increased residency time in the cache to the particular volumes compared to volumes not having the favored status. The method generates a list of the particular volumes and transmits the list to the storage system. The storage system, in turn, provides increased residency time to the particular volumes in accordance with their favored status. A corresponding system and computer program product are also disclosed.

20 Claims, 14 Drawing Sheets

(56) References Cited

U.S. PATENT DOCUMENTS

| | | | |
|---|---|---|---|
| 5,606,688 A | 2/1997 | Mcnutt et al. | |
| 5,649,156 A | 7/1997 | Vishlitzky et al. | |
| 6,219,283 B1 | 4/2001 | Wilford | |
| 6,425,057 B1* | 7/2002 | Cherkasova | G06F 12/121 |
| | | | 711/134 |
| 6,651,141 B2 | 11/2003 | Adrangi | |
| 6,748,487 B1 | 6/2004 | Takamoto et al. | |
| 6,748,494 B1* | 6/2004 | Yashiro | G06F 12/127 |
| | | | 711/133 |
| 7,047,366 B1 | 5/2006 | Ezra | |
| 7,216,196 B2* | 5/2007 | Jeddeloh | G06F 11/3409 |
| | | | 711/105 |
| 8,082,397 B1 | 12/2011 | Ezra et al. | |
| 8,117,396 B1 | 2/2012 | Fair et al. | |
| 8,321,521 B1 | 11/2012 | Raciborski et al. | |
| 8,601,213 B2 | 12/2013 | Brown et al. | |
| 9,176,708 B2 | 11/2015 | Gallant et al. | |
| 9,189,422 B2 | 11/2015 | Shivashankaraiah et al. | |
| 9,323,463 B2 | 4/2016 | Inoue | |
| 9,405,695 B2 | 8/2016 | Chang et al. | |
| 9,632,946 B1 | 4/2017 | Egyed | |
| 9,645,938 B2 | 5/2017 | Kranich et al. | |
| 9,846,650 B2 | 12/2017 | Chang et al. | |
| 9,875,188 B1 | 1/2018 | Egyed | |
| 9,996,476 B2 | 6/2018 | Ash et al. | |
| 10,534,712 B1 | 1/2020 | Fan et al. | |
| 2002/0056025 A1 | 5/2002 | Qiu et al. | |
| 2002/0120886 A1* | 8/2002 | Nguyen | G06F 11/328 |
| | | | 714/39 |
| 2003/0149843 A1 | 8/2003 | Jarvis et al. | |
| 2005/0120180 A1 | 6/2005 | Schornbach et al. | |
| 2006/0069871 A1 | 3/2006 | Gill et al. | |
| 2006/0212263 A1* | 9/2006 | Koehler | G06F 11/3409 |
| | | | 702/182 |
| 2007/0198779 A1* | 8/2007 | Wang | G06F 12/123 |
| | | | 711/136 |
| 2008/0256294 A1 | 10/2008 | Gill | |
| 2009/0055595 A1 | 2/2009 | Gill et al. | |
| 2012/0166723 A1 | 6/2012 | Araki et al. | |
| 2012/0272010 A1 | 10/2012 | Larkby-Iahet et al. | |
| 2013/0036199 A1 | 2/2013 | Leong et al. | |
| 2013/0151780 A1 | 6/2013 | Daly et al. | |
| 2013/0297885 A1* | 11/2013 | Hyde, II | G06F 12/122 |
| | | | 711/136 |
| 2014/0101386 A1* | 4/2014 | Jung | G06F 3/061 |
| | | | 711/118 |
| 2014/0298058 A1* | 10/2014 | Klingauf | G06F 1/3296 |
| | | | 713/322 |
| 2015/0067266 A1 | 3/2015 | Jafri et al. | |
| 2015/0220438 A1 | 8/2015 | Chakalian et al. | |
| 2015/0220552 A1* | 8/2015 | Duzly | G06F 16/1724 |
| | | | 707/693 |
| 2015/0347316 A1 | 12/2015 | Carofiglio et al. | |
| 2016/0041902 A1 | 2/2016 | Atkisson et al. | |
| 2016/0210045 A1* | 7/2016 | Hahn | G06F 3/061 |
| 2017/0068624 A1 | 3/2017 | Ash et al. | |
| 2017/0185520 A1 | 6/2017 | Matsuo | |
| 2018/0095887 A1 | 4/2018 | Craddock et al. | |
| 2018/0150402 A1 | 5/2018 | Ash et al. | |
| 2018/0300257 A1 | 10/2018 | Ash et al. | |
| 2018/0300258 A1* | 10/2018 | Wokhlu | G06F 12/126 |
| 2018/0349035 A1 | 12/2018 | Ellis et al. | |
| 2018/0357173 A1 | 12/2018 | Wei et al. | |
| 2019/0012114 A1 | 1/2019 | Spencer et al. | |
| 2019/0250857 A1 | 8/2019 | Reddy et al. | |
| 2019/0324687 A1 | 10/2019 | Bassov et al. | |
| 2020/0356479 A1 | 11/2020 | Gupta et al. | |

FOREIGN PATENT DOCUMENTS

| | | |
|---|---|---|
| CN | 106649349 A | 5/2017 |
| CN | 107704401 A | 2/2018 |
| EP | 566282 A2 | 10/1993 |
| WO | WO2017176442 A1 | 10/2017 |

OTHER PUBLICATIONS

Badam, et al., "HashCache: Cache Storage for the Next Billion,"Department of Computer Science, Princeton University,Department of Computer Science, University of Pittsburgh, Proceeding NSDI'09 Proceedings of the 6th USENIX symposium on networked systems design and implementation, pp. 123-136, Apr. 2009.

Cao et al., "Implementation and Performance of Application-Controlled File Caching", OSDI '94 Proceedings of the 1st USENIX conference on Operating Systems Design and Implementation, Nov. 1994.

Gill et al., "SARC: Sequential Prefetching in Adaptive Replacement Cache," Proceedings of the 2005 USENIX Annual Technical Conference, Apr. 2005.

Lee et al., "Synchronous 1/0 Scheduling of Independent Write Caches for an Array of SSDs," IEEE Computer Architecture Letters, vol. 14, Issue: 1, Jan. 2014.

Microsoft Corp, "Caching guidance Best practices for cloud Applications" available at https://docs.microsoft.com/en-us/azure/architecture/best-practices/caching, Mar. 2017.

Thiebaut et al., "Improving Disk Cache Hit Ratios through Cache Partitioning," IEEE Transactions on Computers vol. 41, Issue: 6, Jun. 1992.

Tomkins, et al, "Informed Multi-Process Prefetching and Caching," ACM SIGMETRICS Performance Evaluation Review, Jun. 1997.

International Searching Authority, International Search Report and Written Opinion, dated Jul. 28, 2020.

Gill et al., "SARC: Sequential Prefetching in Adaptive Replacement Cache," USENIX Association, 2005 USENIX Annual Technical Conference, Jan. 2005.

Microsoft, "Synchronous and Asynchronous I/O," May 2018.

Stack Overflow, David Schwartz, "Difference Between Synchronous and Asynchronous I/O," Jan. 2016.

Gray, Jim, "Rules of Thumb in Data Engineering," Microsoft Research, IEEE, Dec. 1999.

Da Zheng, et al. "Optimize Unsynchronized Garbage Collection in an SSD Array," arXiv.org > cs > arXiv:1506.07566 Jun. 2015.

Da Zheng, et al. "Toward Millions of File System IOPS on Low-Cost, Commodity Hardware," Proceedings of the International Conference on High Performance Computing, Networking, Storage and Analysis, Nov. 2013.

* cited by examiner

| List 700 | |
|---|---|
| Volume | Residency Multiplier |
| 1. Volume A | $N_1$ |
| 2. Volume B | $N_2$ |
| 3. Volume C | $N_3$ |
| 4. Volume D | $N_4$ |
| 5. Volume E | $N_5$ |
| 6. Volume F | $N_6$ |

902 (braces rows 1-6)

Fig. 11

List 700

| Volume | Residency Multiplier | |
|---|---|---|
| 1. Volume A | $N_1$ | |
| 2. Volume B | $N_1$ | |
| 3. Volume C | $N_1$ | |
| 4. Volume D | $N_2$ | } 902 |
| 5. Volume E | $N_2$ | |
| 6. Volume F | $N_3$ | |
| 7. Volume G | $N_3$ | |

Fig. 12

FAVORED CACHE STATUS FOR SELECTED VOLUMES WITHIN A STORAGE SYSTEM

BACKGROUND

Field of the Invention

This invention relates to systems and methods for increasing cache hit ratios for selected volumes within a storage system.

Background of the Invention

When an I/O request is performed by an application, several processes may be performed to complete the request. These processes affect I/O latency, which can be a significant part of application response time. zHyperLink is a technology designed to reduce I/O latency by providing a fast, reliable, and direct communication path between a host system and a storage system. This is accomplished by installing zHyperLink adapters on the z/OS host system and storage system, and connecting the components together using zHyperLink cables. This configuration creates a point-to-point connection between the host system and storage system, which reduces I/O response times by up to ten times compared to z High-Performance FICON® (zHPF). Such low response times are achieved by using synchronous I/O requests, which reduce the amount of time required for some functions, such as I/O interrupts and z/OS dispatch operations.

Standard I/O processing that is available using technologies, such as zHPF, requires I/O operations to perform a series of time-consuming tasks, such as z/OS dispatching, interrupt handling, CPU queuing, and L1/L2 processor cache reloading. These tasks and others required for I/O processing may cause I/O response times to be relatively long compared to transferring data within virtual storage, with response times of 130+ microseconds plus interrupt handling and CPU dispatch time.

Using zHyperLink or synchronous I/O generally, when a synchronous I/O operation is performed, the CPU on the host system waits or "spins" until the I/O is complete, or a timeout value is reached. zHyperLink can significantly reduce the time that is required to complete the I/O because the dispatching, interrupt handling, CPU queue time, and CPU cache reload activities are no longer necessary. This saves the processor time associated with two context swaps involved in a normal I/O operation, putting the thread to sleep and then re-dispatching it, as well as performing the I/O interrupt.

In order to achieve the improved I/O response times associated with synchronous I/O (e.g., zHyperLink), the code path used to process the I/O needs to be highly optimized. Any conditions that delay a synchronous I/O operation, such as a cache miss, may cause a notification to be returned to a host system and the operation to be retried using a slower communication path such as zHPF. Synchronous I/O is only successful when microcode can complete a synchronous I/O operation in a very short amount of time, such as 10-30 microseconds. If the synchronous I/O operation cannot be completed in that amount of time, it may fail and the host system may need to retry the operation over a non-optimal path such as FICON.

In view of the foregoing, what are needed are systems and methods to improve cache hit ratios for selected volumes when using synchronous I/O technologies such as zHyperLink. Such systems and methods will ideally reduce or prevent delays that may hinder execution of synchronous I/O operations.

SUMMARY

The invention has been developed in response to the present state of the art and, in particular, in response to the problems and needs in the art that have not yet been fully solved by currently available systems and methods. Accordingly, systems and methods have been developed to improve cache hit ratios for selected volumes within a storage system. The features and advantages of the invention will become more fully apparent from the following description and appended claims, or may be learned by practice of the invention as set forth hereinafter.

Consistent with the foregoing, a method for improving cache hit ratios for selected volumes within a storage system is disclosed. In one embodiment, such a method includes monitoring I/O to multiple volumes residing on a storage system. The storage system includes a cache to store data associated with the volumes. The method determines, from the I/O, which particular volumes of the multiple volumes would benefit the most if provided favored status in the cache. The favored status provides increased residency time in the cache to the particular volumes compared to volumes not having the favored status. The method generates a list of the particular volumes and transmits the list to the storage system. The storage system, in turn, provides increased residency time to the particular volumes in accordance with their favored status.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 11 is a high-level block diagram showing a first example of a list of favored volumes and associated residency multipliers;

FIG. 12 is a high-level block diagram showing a second example of a list of favored volumes and associated residency multipliers;

DETAILED DESCRIPTION

Figure 1:
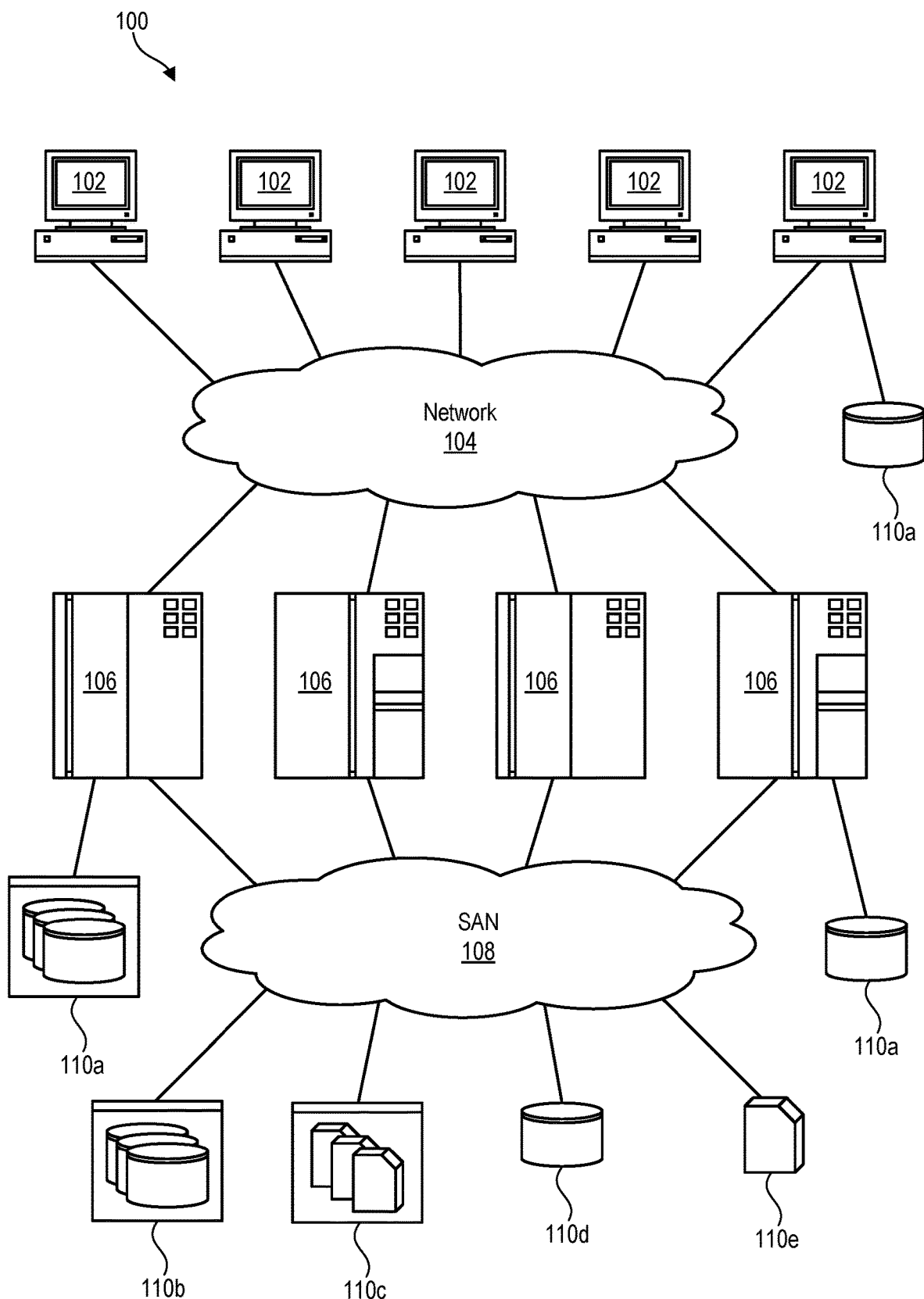
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
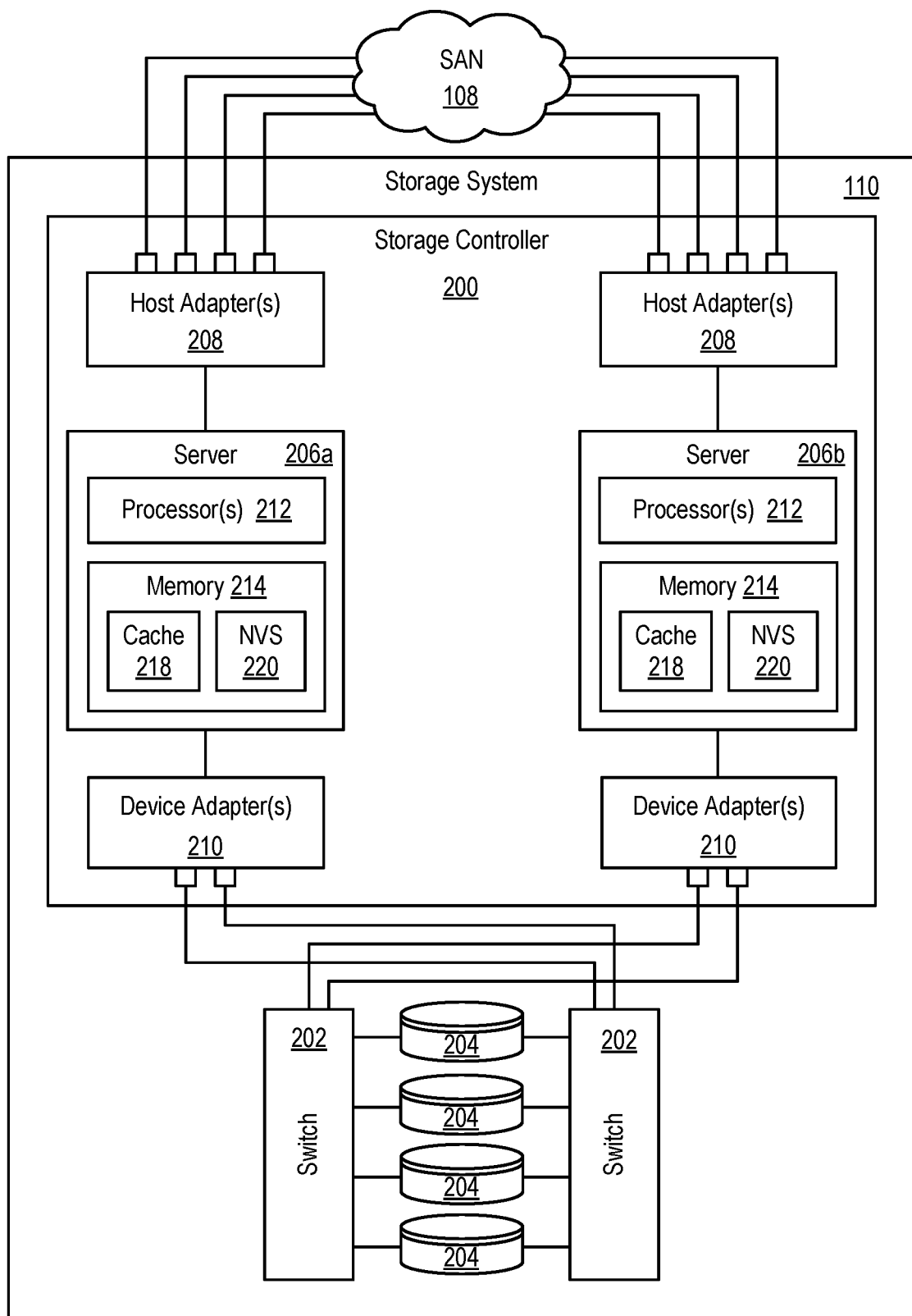
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
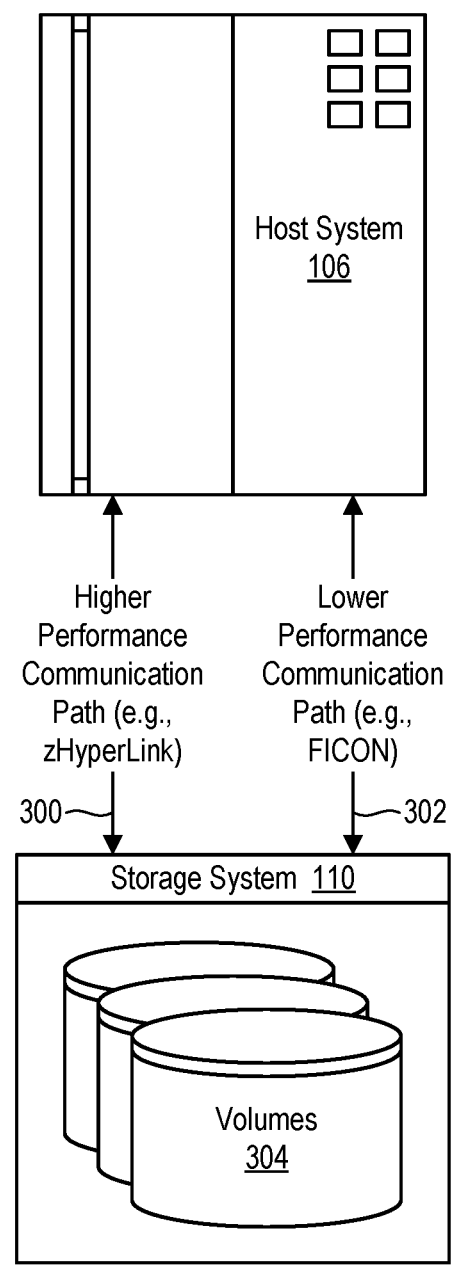
FIG. 3 is a high-level block diagram showing different communication paths between a host system and a storage system.

Referring to FIG. 3, when an I/O request is performed by an application residing on a host system 106, several processes may be performed to complete the request. These processes may affect I/O latency and application response time. zHyperLink is a technology designed to reduce I/O latency by providing a fast, reliable, and direct communication path 300 between a host system and storage system 110. This may be accomplished by installing zHyperLink adapters on the host system 106 and storage system 110, and connecting the components using zHyperLink cables. This configuration creates a point-to-point connection 300 between the host system 106 and the storage system controller 200. This technology may reduce I/O response times by up to ten times compared to using a conventional communication path 302, such as a z High-Performance FICON® (zHPF) communication path 302. Such low response times may be achieved by using synchronous I/O requests, which reduce the amount of time required for some functions, such as I/O interrupts and I/O dispatch operations.

Standard I/O processing that is available using technologies, such as zHPF, requires I/O operations to perform a series of time-consuming tasks, such as z/OS dispatching, interrupt handling, CPU queueing, and L1/L2 processor cache reloading. These tasks and others required for I/O processing may cause I/O response times to be relatively long compared to transferring data within virtual storage, with response times of 130+ microseconds plus interrupt handling and CPU dispatch time.

Using zHyperLink, when a synchronous I/O is performed over the higher performance communication path 300, the CPU on the host system 106 may wait or "spin" until the I/O is complete, or a timeout value is reached. zHyperLink can significantly reduce the time that is required to complete the I/O because the dispatching, interrupt handling, CPU queue time, and CPU cache reload activities are no longer necessary. This reduces processor time needed to perform two context swaps in a normal I/O operation, putting the thread to sleep and then re-dispatching it, as well as performing the I/O interrupt.

In order to achieve the improved I/O response times associated with synchronous I/O, the code path used to process the I/O needs to be highly optimized. Any conditions that delay a synchronous I/O operation, such as a cache miss, may cause a notification to be returned to a host system 106 and the operation to be retried over a slower communication path 302, such as zHPF. Synchronous I/O over the higher performance communication path 300 is typically only successful when microcode can complete a synchronous I/O operation in a very short amount of time, such as 10-30 microseconds. If a synchronous I/O operation cannot be completed in that amount of time, the synchronous I/O operation may be failed and the host system 106 may need to retry the operation over a non-optimal path 302 such as FICON.

Figure 4:
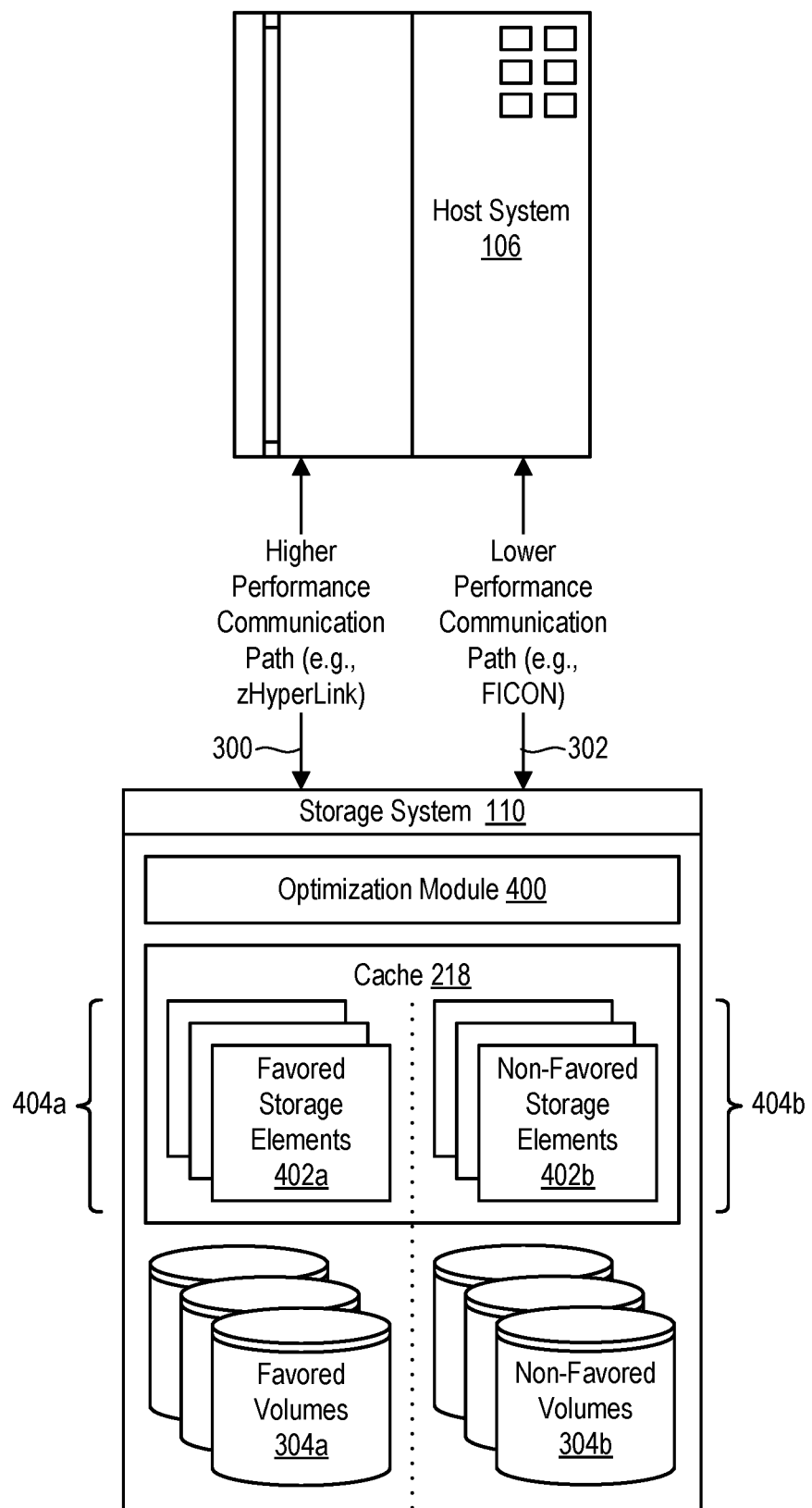
FIG. 4 is a high-level block diagram showing a system for improving cache hit ratios for selected volumes when using synchronous I/O.

Referring to FIG. 4, while continuing to refer generally to FIG. 3, in order to perform synchronous I/O to data stored in volumes 304 of the storage system 110, the requested data is ideally contained in cache 218. A cache miss may cause the synchronous I/O operation to fail and be retried over a slower communication path 302, such as zHPF. In order to improve cache hit ratios for data that is accessed using synchronous I/O, in certain embodiments, volumes 304 on a storage system 110 may be divided into favored volumes 304a and non-favored volumes 304b. Favored volumes 304a may be those volumes 304 that are preferably accessed using synchronous I/O. These may be volumes 304 that are deemed more important or critical, or contain data where performance is important or critical (e.g., directories, etc.) Non-favored volumes 304b, by contrast, may be any volumes 304 that are not designated as favored volumes 304a.

As shown in FIG. 4, the volumes 304 may be made up of storage elements 402, such as tracks. Storage elements 402 from favored volumes 304a may be designated as favored storage elements 402a, whereas storage elements 402 from non-favored volumes 304b may be designated as non-favored storage elements 402b. At any given time, a cache 218 of the storage system 110 may store a first set 404b of non-favored storage elements 402b and a second set 404a of favored storage elements 402a from the non-favored volumes 304b and favored volumes 304a respectively. Because the favored volumes 304a are those volumes 304 where use of synchronous I/O is preferred, the favored storage elements 402a may be preferred in cache 218 over the non-favored storage elements 402b. This will ideally increase cache hit ratios for the favored storage elements 402a, thereby optimizing synchronous I/O and increasing the percentage of synchronous I/O operations that complete successfully.

In order to provide preferred treatment of favored storage elements 402a over non-favored storage elements 402b in the cache 218, an optimization module 400 may be provided. Among other things, the optimization module 400 may provide functionality to designate which volumes 304 are favored and non-favored, as well as implement a cache eviction policy wherein favored storage elements 402a reside in cache 218 longer than non-favored storage elements 402b. The optimization module 400 and its functionality will be discussed in more detail in association with FIG. 5.

Figure 5:
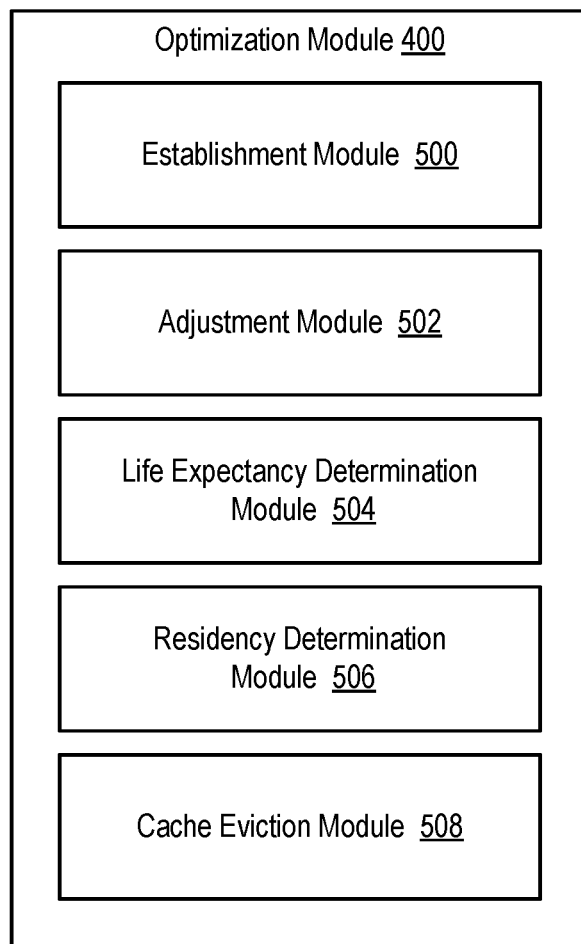
FIG. 5 is a high-level block diagram showing various exemplary sub-modules within an optimization module in accordance with the invention.

Referring to FIG. 5, a high-level block diagram showing the optimization module 400 and associated sub-modules is illustrated. The optimization module 400 and associated sub-modules may be implemented in hardware, software, firmware, or combinations thereof. The optimization module 400 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules. Although the optimization module 400 and associated sub-modules are shown within the storage system 110, all functionality is not necessarily implemented within the storage system 110 nor is it limited to implementation within the storage system 110. Thus, the location of the optimization module 400 and associated sub-modules is provided by way of example and not limitation.

As shown, the optimization module 400 includes one or more of an establishment module 500, adjustment module 502, life expectancy determination module 504, residency determination module 506, and cache eviction module 508. The establishment module 500 may be configured to designate favored volumes 304a and non-favored volumes 304b as previously discussed. In certain embodiments, the host system 106 communicates these designations to the storage system 110. In certain embodiments, the favored/non-favored volumes 304 are established using an online command or a configuration list. In other embodiments, functionality may be built into the host system 106 to determine which volumes 304 to favor/non-favor. For example, the host system 106 may observe I/O patterns and may determine that certain volumes 304 should be or are preferably accessed using the faster synchronous I/O process. The host system 106 may add these volumes 304 to the set of favored volumes 304a.

The adjustment module 502 may adjust which volumes 304 are favored/non-favored. For example, as time passes, access patterns or data importance may change on the volumes 304. The adjustment module 502 may, in certain embodiments, adjust which volumes 304 are considered favored/non-favored as these access patterns or data importance change. Alternatively, the adjustment module 502 may enable a user to manually adjust the volumes 304 that are considered favored or non-favored. In certain embodiments, as will be explained in more detail in association with FIG. 7, the host system 102 periodically sends commands and/or lists to the storage system 110 to change or update which volumes 304 are considered favored or non-favored.

The life expectancy determination module 504 may be configured to determine the life expectancy (i.e., residency time) of storage elements (e.g., tracks) in cache 218. For example, in certain embodiments, the life expectancy determination module 504 is configured to determine the amount of time non-favored storage elements 402b will reside cache 218 prior to being evicted. This life expectancy may be a number at some point in time or an average over a period of time. In certain embodiments, the life expectancy is calculated by subtracting a timestamp of a least recently used non-favored storage element 402b in the cache 218, from a timestamp of a most recently used non-favored storage element 402b in the cache 218, where the timestamps indicate when the non-favored storage elements 402b were most recently accessed.

The residency determination module 506, by contrast, may determine how long a particular storage element has resided in cache 218. The residency time may be calculated, for example, by subtracting the timestamp of a storage element 402 (which indicates the time the storage element 402 was most recently accessed) from the current time.

Using the life expectancy calculated by the life expectancy determination module 504 and the residency time calculated by the residency determination module 506, the cache eviction module 508 may execute a cache eviction policy such that favored storage elements 402a are maintained in cache 218 longer than the life expectancy of the non-favored storage elements 402b. For example, the cache eviction policy may require that favored storage elements 402a are maintained in cache 218 for double the life expectancy of non-favored storage elements 402b. Other multiples (i.e., numbers, decimals, or fractions that are greater than one) are possible and within the scope of the invention. One example of a method 600 that may be executed by the cache eviction module 508 is described in association with FIG. 6.

Figure 6:
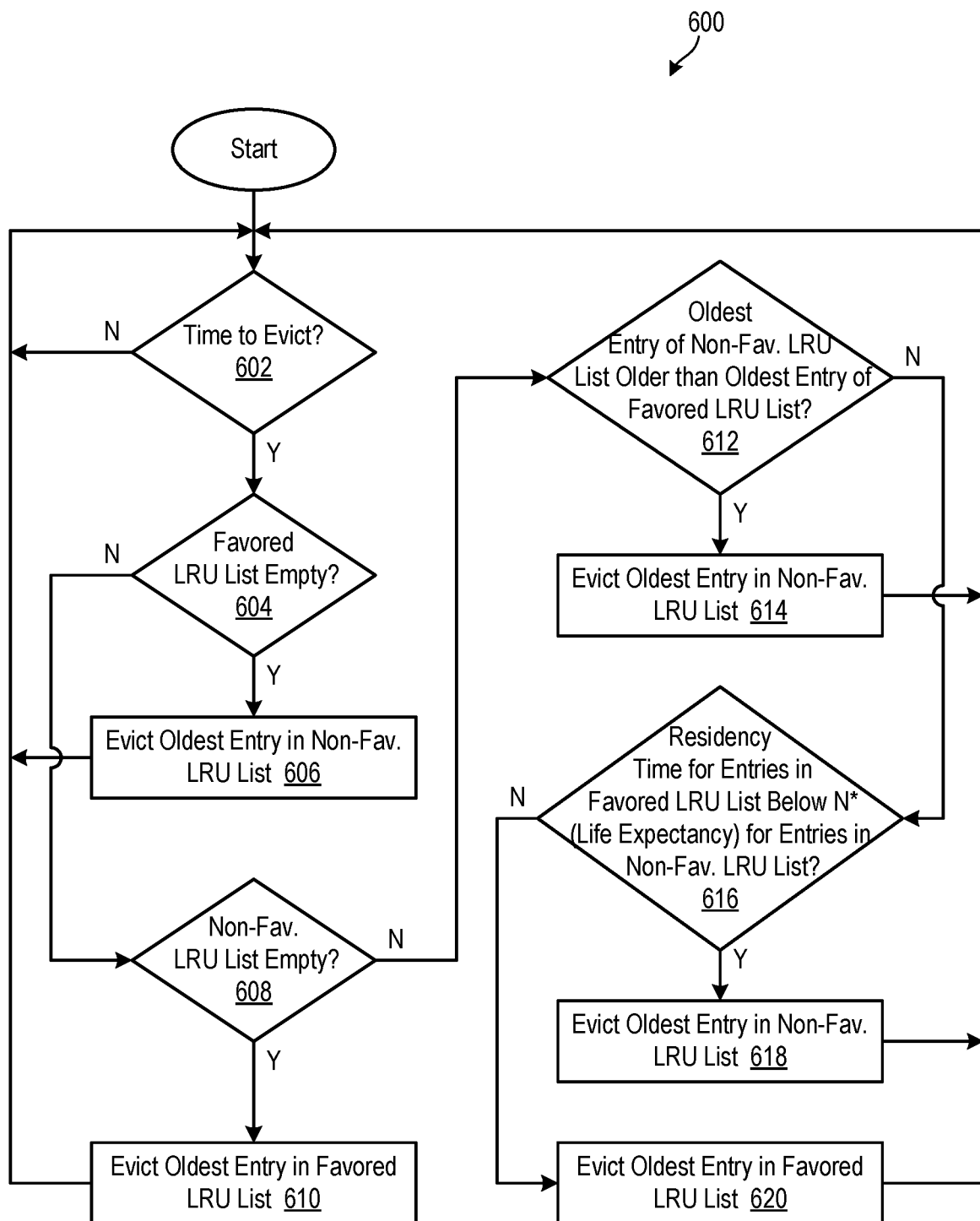
FIG. 6 is a flow diagram showing one embodiment of a method for evicting storage elements from cache in order to free up space in the cache while providing a preference to favored storage elements.

FIG. 6 shows one embodiment of a method 600 for evicting entries from cache 218 in order to free up space in the cache 218. The method 600 references the first set 404b of non-favored storage elements 402b and the second set 404a of favored storage elements 402a previously described in association with FIG. 4. In certain embodiments, the first set 404b of non-favored storage elements 402b is documented in a first LRU (least recently used) list (i.e., a "non-favored" LRU list), and the second set 404a of favored storage elements 402a is documented in a second LRU list (i.e., a "favored" LRU list).

As shown, the method 600 initially determines 602 whether it is time to evict one or more storage elements 402 from cache 218. This step 602 may, in certain embodiments, involve determining whether the cache 218 is low on free space. If it is time to evict entries from cache 218, the method 600 determines 604 whether the "favored" LRU list is empty. If so, the method 600 evicts 606, from cache 218, the oldest non-favored storage element 402b (i.e., the non-favored storage element 402b with the oldest timestamp) listed in the "non-favored" LRU list. If the "favored" LRU list is not empty, the method 600 determines 608 whether the "non-favored" LRU list is empty. If so, the method 600 evicts 610, from cache 218, the oldest favored storage element 402a listed in the "favored" LRU list.

If neither the "non-favored" LRU list nor the "favored" LRU list is empty, method 600 determines 612 whether the oldest non-favored storage element 402b in the "non-favored" LRU list has an older timestamp than the oldest favored storage element 402a in the "favored" LRU list. If so, the method 600 evicts 614, from cache 218, the oldest non-favored storage element 402b in the "non-favored" LRU list. If not, the method 600 proceeds to step 616. At step 616, the method 600 determines 616 whether the residency time of an oldest favored storage element 402a in the cache 218 (i.e., the amount of time that the oldest favored storage element 402a in the "favored" LRU list has resided in the cache 218) is less than the multiple N multiplied by the life expectancy of non-favored storage elements 402b in the cache 218. If so, the method 600 evicts 618, from cache 218, the oldest non-favored storage element 402b in the "non-favored" LRU list. By contrast, if the residency time for an oldest favored storage element 402a in the "favored" LRU list is more than N*(the life expectancy of non-favored storage elements 402b in the cache 218), the method 600 evicts 620, from cache 218, the oldest favored storage element 402a in the "favored" LRU list. The variable N is a residency multiplier, details of which will be explained in more detail hereafter.

Figure 7:
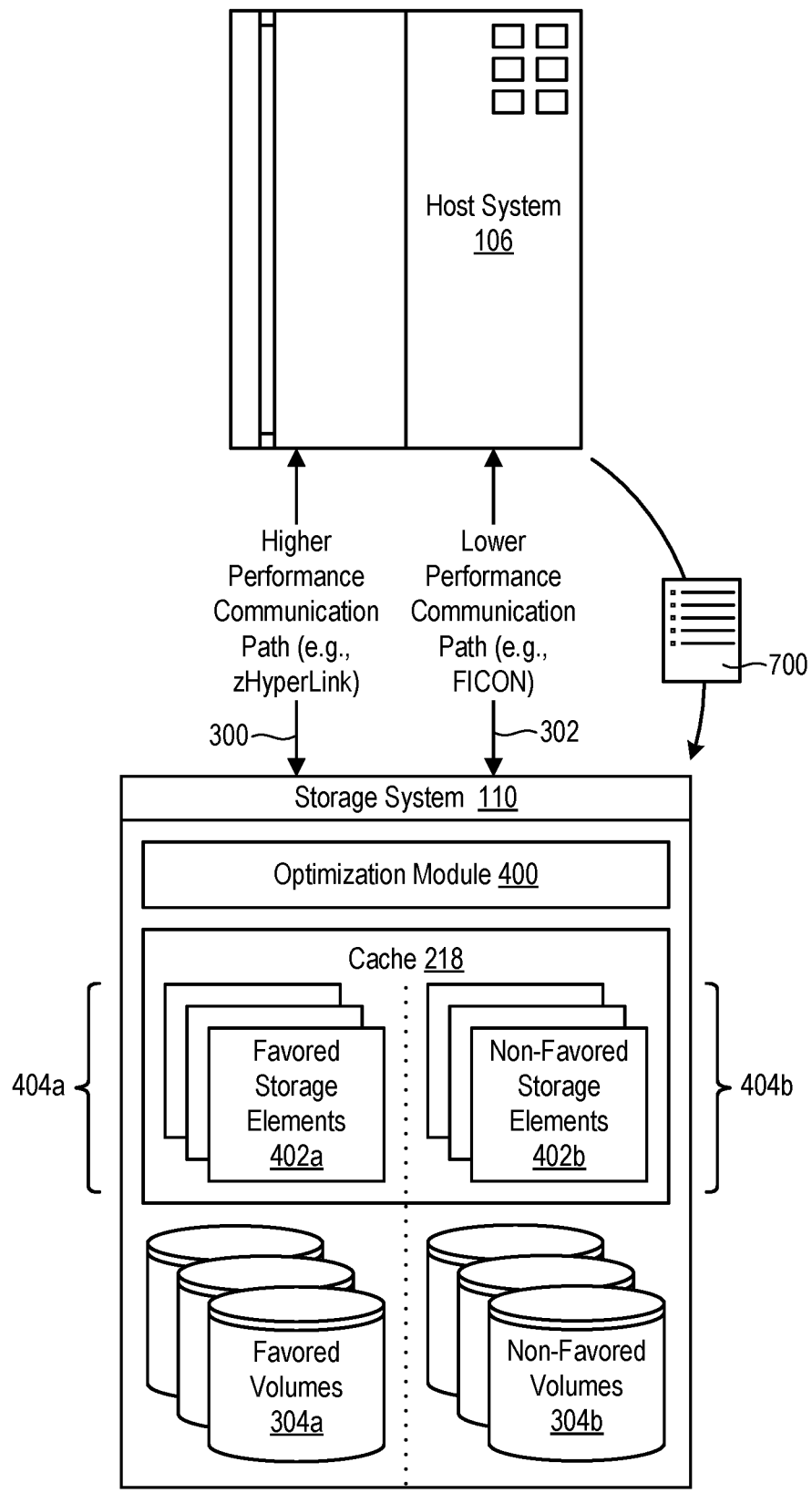
FIG. 7 is a high-level block diagram showing a host system sending commands and/or lists to a storage system to designate which volumes should be treated as favored and unfavored.

Referring to FIG. 7, as previously mentioned, a host system 102 may periodically send commands and/or lists to the storage system 110 to change or update which volumes 304 are considered favored or non-favored, and thus which storage elements 402 are given a cache preference. In certain embodiments, the host system 102 periodically sends a command to the storage system 110 with a list 700 of volumes 304 that should be favored. This list 700 of volumes 304 may change each time the host system 102 issues a command to the storage system 110. If a volume 304 was previously designated in the list 700 as favored but is not designated as such in a new list 700, the storage system 110 may change the status of the volume 304 to unfavored and cease to provide a cache preference to the volume 304.

In certain embodiments, the host system 102 may set an indicator (e.g., a "FORCE FAVORED CACHE" indicator) for a particular volume 304 that indicates that the volume 304 is to retain its favored status until the host system 102 affirmatively changes the volume status to unfavored. The host system 102 may use a "REMOVE FAVORED CACHE" command to change the status of a volume 304 from favored to unfavored. In certain embodiments, the "FORCE FAVORED CACHE" indicator may have a duration attached to it that indicates how long the volume 304 should have favored status before it returns to unfavored status. After the duration expires and the volume 304 is no longer contained in the list 700, the status of the volume 304 may be automatically changed to unfavored so that it does not receive a cache preference.

Figure 8:
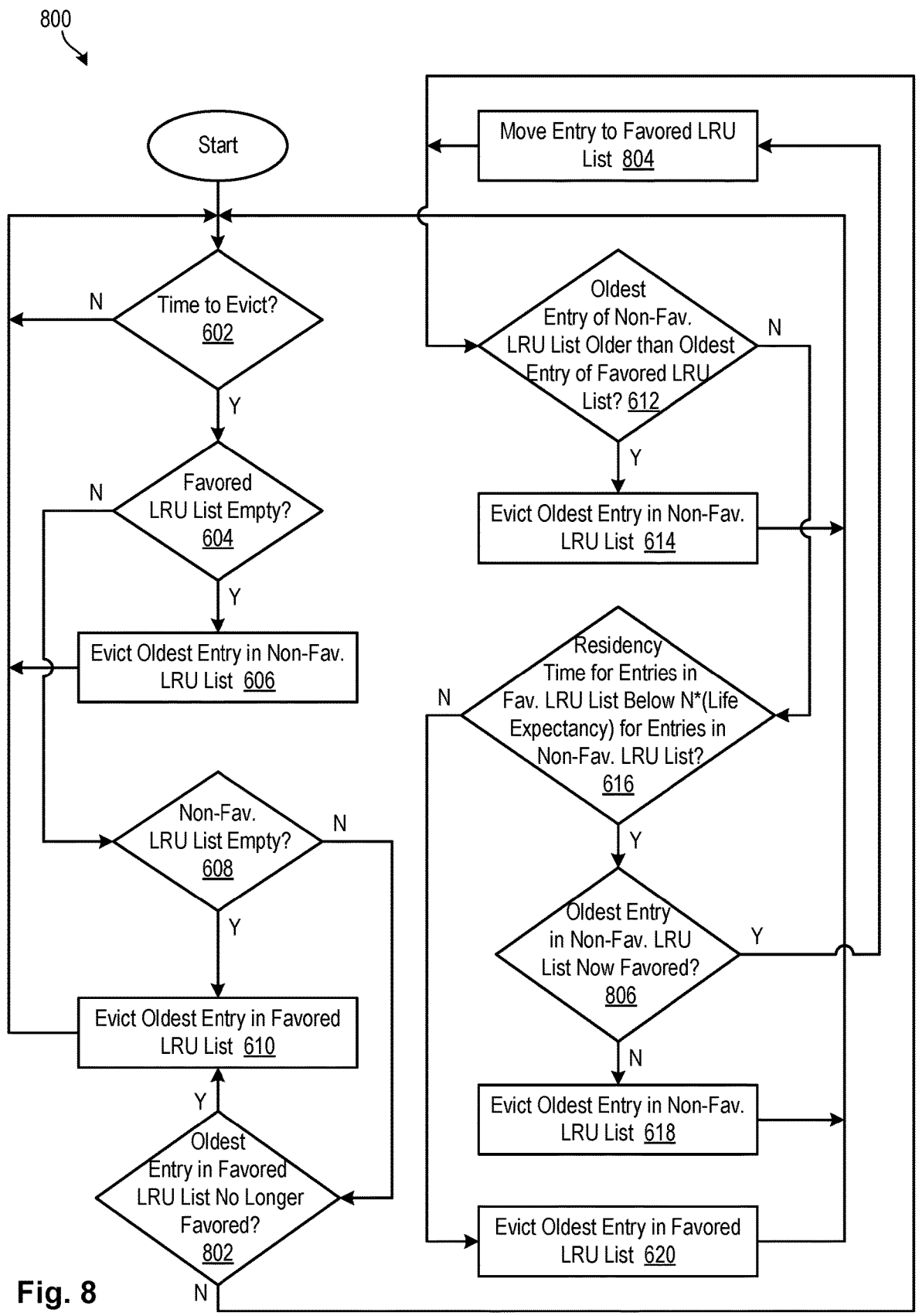
FIG. 8 is a flow diagram showing an alternative method for evicting storage elements from cache in order to free up space in the cache while providing a preference to favored storage elements.

Referring to FIG. 8, because volumes 304 may be dynamically changed from favored to unfavored status and vice versa, various modification may be made to the method 600 of FIG. 6 to account for that fact that a volume's status may have changed. This status change may warrant moving storage elements 402 from the "non-favored" LRU list to the "favored" LRU list or vice versa.

FIG. 8 shows one embodiment of method 800 for evicting entries (i.e., storage elements 402) from cache 218 in order to free up space in the cache 218. This method 800 is similar to the method 600 illustrated in FIG. 6 except that the method 800 has been modified to account for volumes 304 that may have changed from favored to unfavored status and vice versa. The steps of the method 800 that are the same as the method 600 of FIG. 6 are shown with the same numbering, while new steps (i.e., steps 802, 804, and 806) have been assigned new numbering. The flow of the method 800 compared to the method 600 of FIG. 6 has also been altered somewhat to account for the new steps 802, 804, and 806.

As shown in FIG. 8, after determining 608 whether the "non-favored" LRU list is empty, the method 800 may determine 802 whether the oldest entry of the "favored" LRU list is no longer favored. In other words, the method 800 may determine 802 whether the status of the oldest entry (i.e., storage element 402) in the "favored" LRU list was changed from favored to unfavored. If so, the method 800 evicts 610, from cache 218, the oldest entry in the "favored" LRU list.

Similarly, after the decision step 616 has been performed, the method 800 determines 806 whether the oldest entry in the "non-favored" LRU list is now favored. In other words, the method 800 determines 806 whether the status of the oldest entry (i.e., storage element 402) in the "non-favored" LRU list was changed from unfavored to favored. If so, the method 800 moves 804 the entry from the "non-favored" LRU list to the most recently used end of the "favored" LRU list and the method 800 returns to step 612. If not, the method 800 evicts 618, from cache 218, the oldest entry in the "non-favored" LRU list.

Figure 9:
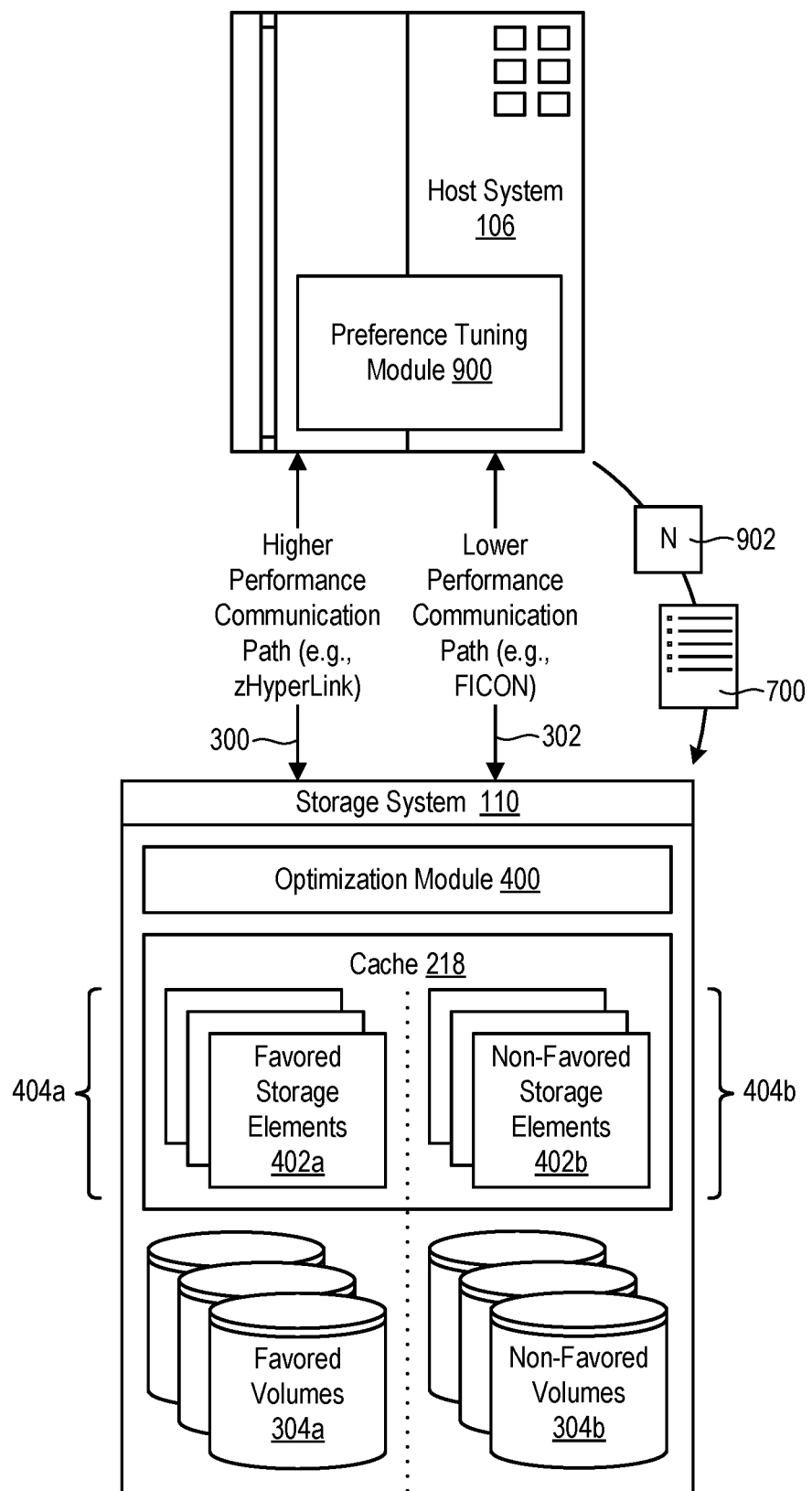
FIG. 9 is a high-level block diagram showing a host system sending a residency multiplier to a storage system to indicate how strong of a cache preference to apply to favored volumes.

Referring to FIG. 9, as previously mentioned, a host system 102 may periodically send a command to a storage system 110 that includes a list 700 of which volumes 304 should be favored. In certain embodiments, the host system 102 may include, with the list 700, a residency multiplier 902 that indicates how strong a cache preference to apply to the favored volumes 304a. The higher the residency multiplier 902, the stronger the cache preference and thus the longer favored volumes 304a will be retained in cache 218 relative to non-favored volumes 304b. The lower the residency multiplier 902, the weaker the cache preference and thus the shorter favored volumes 304a will be retained in cache 218 relative to non-favored volumes 304b. In certain embodiments, a single residency multiplier 902 is provided for all favored volumes 304a in the list 700. In other embodiments, different residency multipliers 902 are provided for different favored volumes 304a, as will be explained in more detail in association with FIGS. 10 and 11.

A preference tuning module 900 may be provided on the host system 102 or another system to determine which volumes 304 should be treated as favored volumes 304a, as well as determine the residency multiplier(s) 902 for each of the favored volumes 304a. In general, the preference tuning module 900 may track I/O to the volumes 304 on the storage system 110 and, based on this tracking information, determine which volumes 304 should be treated as favored. Using the tracking information, the preference tuning module 900 may also determine how strong the cache preference should be for the favored volumes 304a individually or as a whole.

Figure 10:
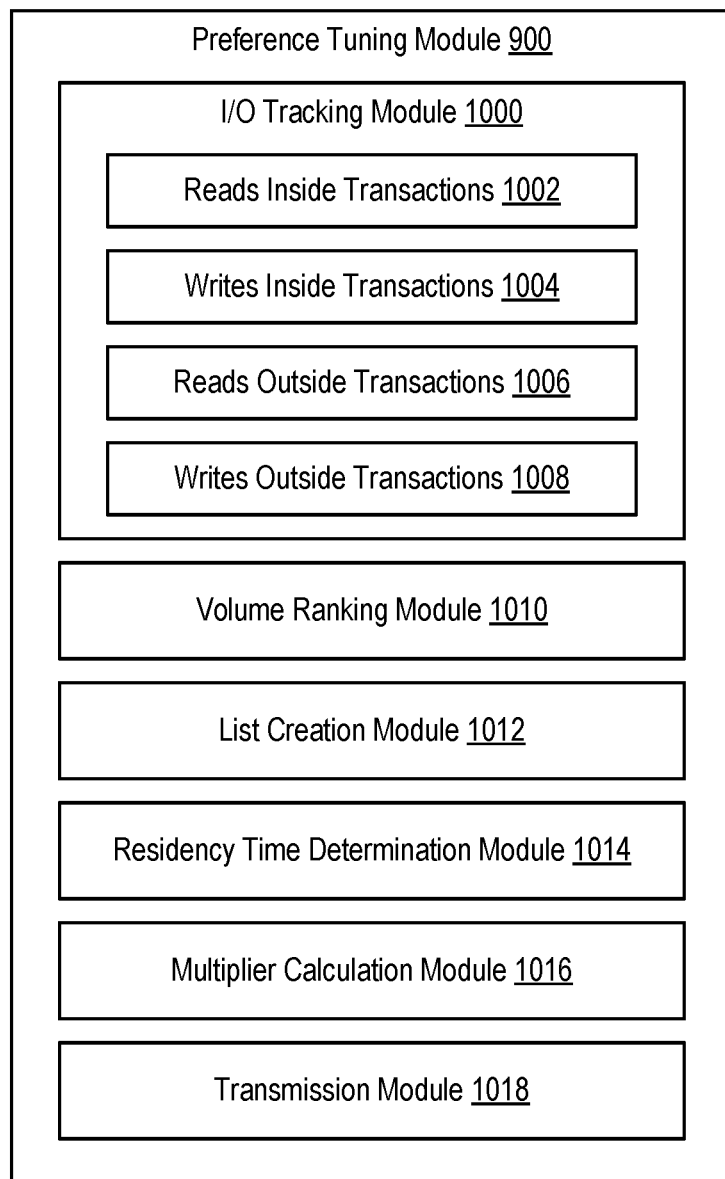
FIG. 10 is a high-level block diagram showing a preference tuning module for tuning a cache preference for favored volumes.

Referring to FIG. 10, a high-level block diagram showing the preference tuning module 900 and associated sub-modules is illustrated. The preference tuning module 900 and associated sub-modules may be implemented in hardware, software, firmware, or combinations thereof. The preference tuning module 900 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules. Although the preference tuning module 900 and associated sub-modules are shown within the host system 102, all functionality is not necessarily implemented within the host system 102 nor is it limited to implementation within the host system 102. Thus, the location of the preference tuning module 900 and associated sub-modules is provided by way of example and not limitation.

As shown, the preference tuning module 900 includes one or more of an I/O tracking module 1000, volume ranking module 1010, list creation module 1012, residency time determination module 1014, multiplier calculation module 1016, and transmission module 1018.

The I/O tracking module 1000 may be configured track I/O that is issued from a host system 102 to a storage system 110. This I/O may indicate which volumes 304 should be favored and accessed via a faster synchronous I/O process. For example, a higher amount of I/O to a volume 304 may indicate that a job is running against the volume 304 and the job could be executed faster and more efficiently using synchronous I/O. In such a scenario, the volume 304 may be granted a cache preference in order to retain more of its data in cache 218 for a longer amount of time, thereby ensuring a higher cache hit ratio when accessing the volume 304.

When tracking I/O to a volume 304, the I/O tracking module 1000 may differentiate between different types of I/O. For example, the I/O tracking module 1000 may track reads 1002 inside transactions, writes 1004 inside transactions, reads 1006 outside transactions, and writes 1008 outside transactions. In certain embodiments, the I/O tracking module 1000 may utilize counters to track an amount of each of these different types of I/O against a volume 304.

Using the information gathered by the I/O tracking module 1000, the volume ranking module 1010 may rank volumes 304 on the storage system 110. For example, the volume ranking module 1010 may rank each volume 304 using the formula $A*L+B*M+C*P+D*Q$, where A is a number of accesses to a volume 304 for reads inside transactions, B is a number of accesses to the volume 304 for writes inside transactions, C is a number of accesses to the volume 304 for reads outside transactions, and D is a number of accesses to the volume 304 for writes outside transactions. L, M, P, and Q are weight coefficients (e.g., L=4, M=3, P=2, Q=1), where L>M>P>Q. In other words, accesses to volumes 304 inside transactions may be weighted more heavily than accesses to volumes 304 outside transactions for the purpose of establishing a cache preference. Also, reads to volumes 304 may be weighted more heavily than writes to volumes 304 for the purpose of establishing a cache preference.

Using the output of the above-described calculation for each volume 304, the volume ranking module 1010 may rank volumes 304 on the storage system 110 by the magnitude of their output value. Volumes 304 with greater amounts of I/O may, in general, have a larger output value and thus be ranked higher than volumes 304 with lesser amounts of I/O within the same time period. The list creation module 1012 may then create a list 700 of volumes 304 that should be favored and provided a cache preference. This may be a certain number of the most highly ranked volumes 304, volumes 304 with an output value above a certain threshold, or the like.

The residency time determination module 1014 may determine the residency time (i.e., life expectancy) of storage elements 402 of non-favored volumes 304b within the cache 218. The multiplier calculation module 1016 may then determine a residency multiplier 902 for favored volumes 304a. For example, if storage elements 402 of favored volumes 304a are to reside in cache 218 for twice the amount of time as storage elements 402 of non-favored volumes 304b, the residency multiplier 902 may be set at two. In certain embodiments, the residency multiplier 902 is determined by taking the above-described output value from a favored volume 304a and dividing it by the output value from a non-favored volume 304b to yield a ratio. If desired, a floor may be set for the residency multiplier 902 such that it does not fall below a certain value (e.g., two), regardless of the ratio. This will ensure that the storage elements 402 of favored volumes 304a are retained in cache 218 for at least twice the amount of time as the storage elements 402 of non-favored volumes 304b.

Once the list 700 has been created and the residency multiplier 902 has been determined, the transmission module 1018 may transmit the list 700 and residency multiplier 902 from the host system 102 to the storage system 110. As previously explained, in certain embodiments, a single residency multiplier 902 may be calculated for all favored volumes 304a in the list 700. In other embodiments, a different residency multiplier 902 (N) may be calculated for each favored volume 304a in the list 700, as shown in FIG. 11. As illustrated in FIG. 11, the list 700 documents volumes 304 that are to be favored in order of ranking (i.e., in order of their output values using the above-described calculation). Each favored volume 304a has a different residency multiplier 902 associated therewith. The higher rank of the volume 304, the larger residency multiplier 902. As previously mentioned, the residency multiplier 902 may be multiplied by the life expectancy of storage elements 402 of non-favored volumes 304b to determine the amount of time storage elements 402 of favored volumes 304a should be retained in cache 218.

Referring to FIG. 12, in certain embodiments, favored volumes 304a in the list 700 may share the same residency multiplier 902 and thus have the same preferred cache residency time. For example, a first set of favored volumes 304a (i.e., Volumes A, B, and C) may be assigned a first residency multiplier $N_1$, a second set of favored volumes 304a (i.e., Volumes D and E) may be assigned a second residency multiplier $N_2$, and a third set of favored volumes 304a (i.e., Volumes F and G) may be assigned a third residency multiplier $N_3$, where $N_1 > N_2 > N_3$. Each residency multiplier 902 indicates how strong the cache preference (i.e., preferred cache residency time) should be for its respective group of favored volumes 304a. In certain embodiments, in a storage system 110 such as the IBM DS8000™ enterprise storage system 110, the residency multiplier 902 for each volume 304 is stored in a global status area (e.g., an area in cache 218 that is mirrored to more persistent storage drives 204) so that the residency multiplier 902 is not lost across reboots, power loss, failures, or the like.

Figure 13:
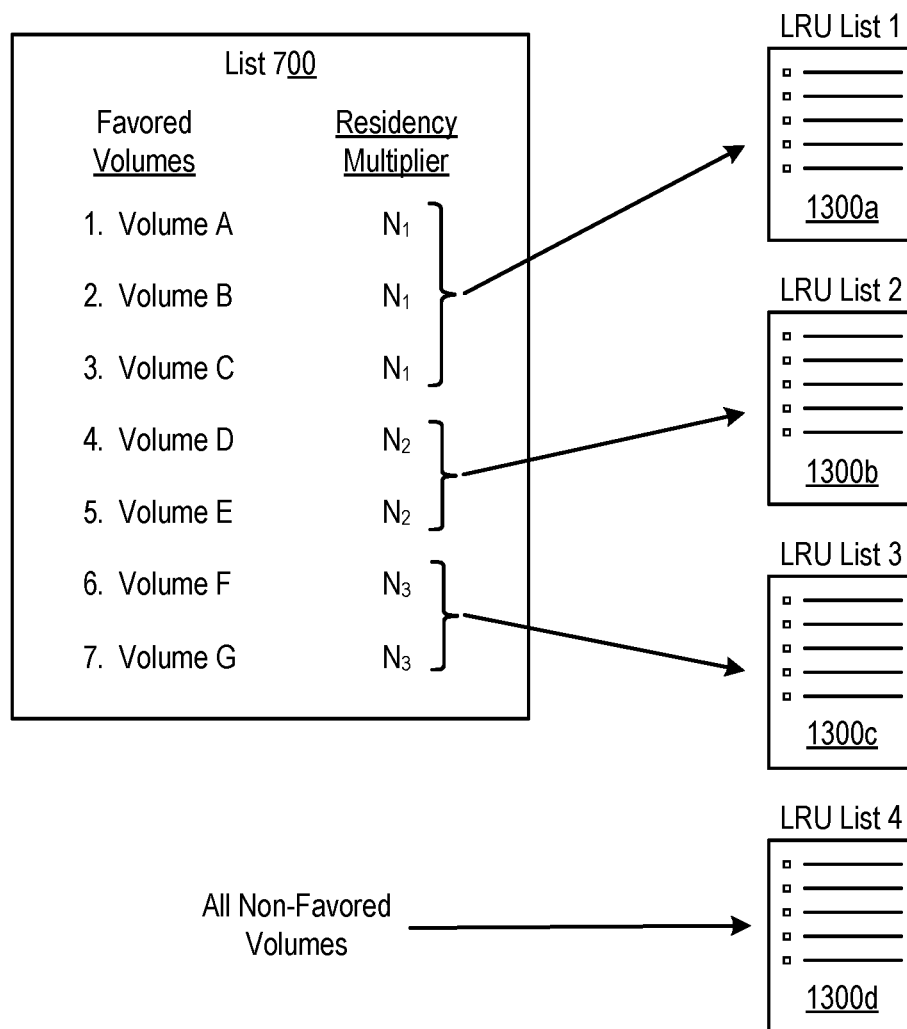
FIG. 13 is a high-level block diagram showing an LRU list for each group of favored volumes that have the same residency multiplier, as well as an LRU list for non-favored volumes.

Referring to FIG. 13, in certain embodiments, an LRU list 1300 is created for each residency multiplier 902 and associated group of favored volumes 304a. An LRU list 1300d may also be created for all non-favored volumes 304b (i.e., volumes 304 without a residency multiplier 902 or with a residency multiplier 902 of one). When an unmodified storage element 402 (e.g., an unmodified track) is added to the cache 218, the volume 304 associated with the storage element 402 may be checked to determine if it is a favored volume 304a and, if so, what the residency multiplier 902 is for the volume 304. Based on the residency multiplier 902 (or lack thereof) for the volume 304, an entry associated with the unmodified storage element 402 may be added to the most recently used (MRU) end of appropriate LRU list 1300. In the event an LRU list 1300 does not exist for the residency multiplier 902 associated with the volume 304, an LRU list 1300 may be created for the residency multiplier 902 and an entry associated with the unmodified storage element 402 may be added to the newly created LRU list 1300.

Figure 14:
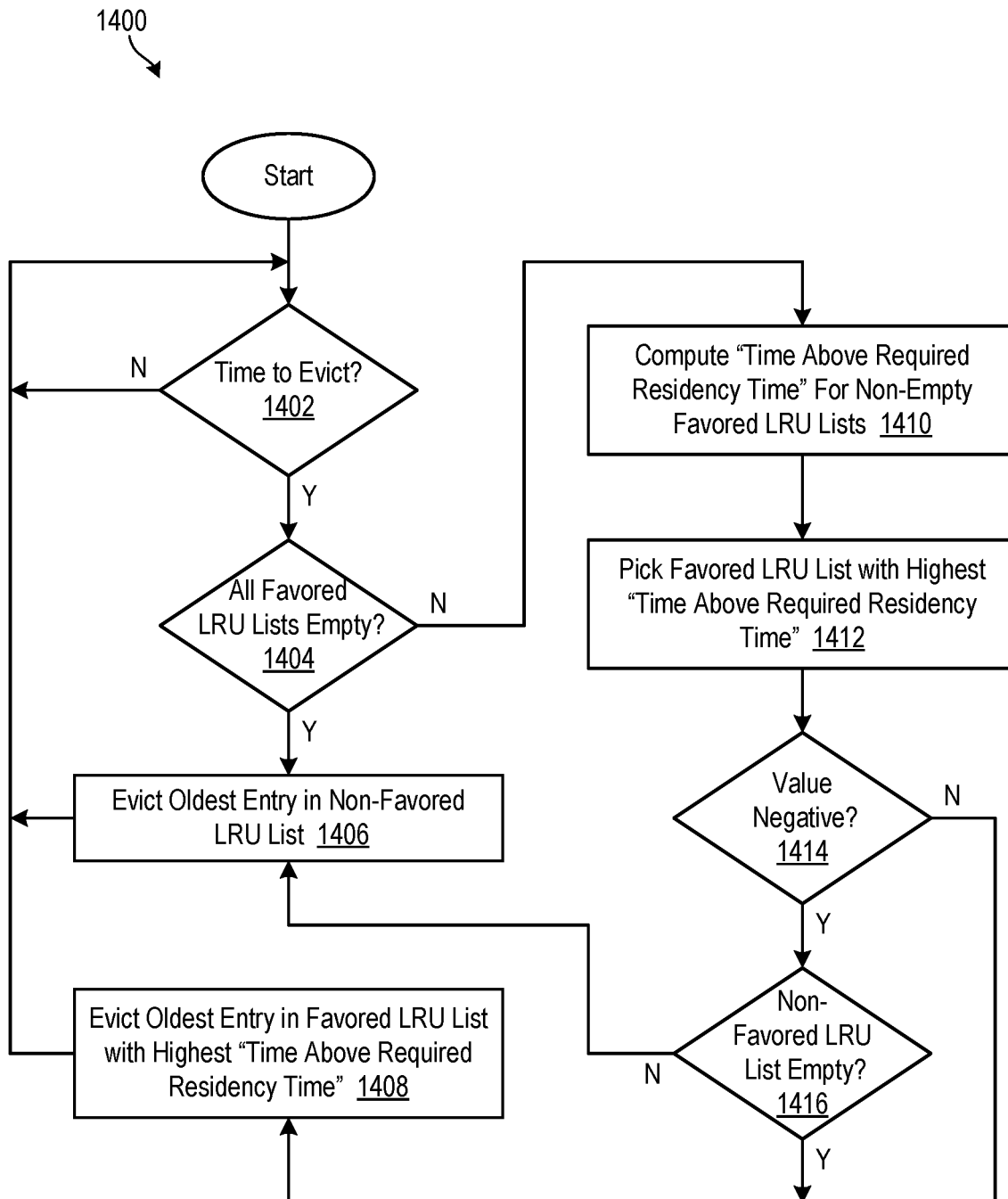
FIG. 14 is a flow diagram showing a method for evicting storage elements from cache using LRU lists such as those illustrated in FIG. 13.

FIG. 14 shows a method 1400 for evicting storage elements from cache 218 using LRU lists 1300 such as those illustrated in FIG. 13. As shown, the method 1400 initially determines 1402 whether it is time to evict one or more storage elements 402 from the cache 218. This step 1402 may, in certain embodiments, involve determining whether the cache 218 is low on free space. If it is time to evict entries from cache 218 (e.g., the cache 218 is low on free space), the method 1400 determines 1404 whether the LRU lists 1300 associated with favored volumes 304a (hereinafter referred to as "favored" LRU lists 1300) are all empty. If so, the method 1400 evicts 1406, from cache 218, the storage element 402 associated with the oldest entry (i.e., the entry on the LRU end of the LRU list) in the LRU list 1300 for non-favored volumes 304b (hereinafter referred to as the "non-favored" LRU list 1300).

If, on the other hand, the "favored" LRU lists 1300 are not all empty, the method 1400 computes 1410 a "time above required residency time" for non-empty "favored" LRU lists 1300. In certain embodiments, the "time above required residency time" may be calculated by determining the residency time of the oldest entry in the "favored" LRU list 1300 and subtracting, from this value, the "life expectancy" multiplied by the residency multiplier 902. As previously explained, the "life expectancy" may be equivalent to the amount of time non-favored storage elements 402b will reside cache 218 prior to being evicted. In general, the step 1410 determines the amount by which an oldest entry in the "favored" LRU list 1300 has exceeded (or fallen short of) its preferred residency time in cache 218.

The method 1400 then picks 1412 the "favored" LRU list 1300 where the "time above required residency time" for the oldest entry is the largest. The method 1400 then determines 1414 whether this "time above required residency time" is negative (meaning that the storage element associated with the oldest entry in the "favored" LRU list 1300 has resided in cache 218 for some amount of time less than its preferred residency time). If the "time above required residency time" is negative, the method 1400 determines 1416 whether the "non-favored" LRU list 1300 is empty. If it is not empty, the method 1400 evicts 1406, from cache 218, the storage element 402 associated with the oldest entry in the "non-favored" LRU list 1300.

If, at step 1414, the "time above required residency time" is not negative (meaning that the oldest entry in the "favored" LRU list 1300 has resided in cache 218 for some amount of time greater than or equal to its preferred residency time), the method 1400 evicts 1408, from cache 218, the storage element associated with the oldest entry in the "favored" LRU list 1300 with the greatest "time above required residency time." Similarly, if the "non-favored" LRU list 1300 is found to be empty at step 1416, the method 1400 also evicts 1408, from cache 218, the oldest entry in the "favored" LRU list 1300 with the greatest "time above required residency time."

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving cache hit ratios for selected volumes within a storage system, the method comprising:
    monitoring I/O to a plurality of volumes residing on a storage system, the storage system comprising a cache;
    determining, from the I/O, which particular volumes of the plurality of volumes would benefit the most if provided favored status in the cache, the favored status providing increased residency time in the cache compared to volumes not having the favored status;
    generating, by a host system, a list of the particular volumes that have the favored status in the cache and transmitting the list from the host system to the storage system; and
    providing, by the storage system, increased residency time to the particular volumes in the list in accordance with their favored status.

2. The method of claim 1, further comprising maintaining, by the storage system, the favored status of the particular volumes until an instruction is received to remove their favored status.

3. The method of claim 1, further comprising periodically updating the list of particular volumes and transmitting the updated list to the storage system.

4. The method of claim 3, further comprising removing the favored status for any volumes not contained in the updated list.

5. The method of claim 1, wherein monitoring the I/O comprises monitoring, for each volume of the plurality of volumes, at least one of the following: (1) a number of accesses to the volume for reads made inside the context of transactions; (2) a number of accesses to the volume for writes made inside the context of transactions; (3) a number of accesses to the volume for reads made outside the context of transactions; and (4) a number of accesses to the volume for writes made outside the context of transactions.

6. The method of claim 5, further comprising, when determining the favored status for each volume of the plurality of volumes, providing more weight to accesses to the volume made inside the context of transactions than accesses to the volume made outside the context of transactions.

7. The method of claim 5, further comprising, when determining the favored status for each volume of the plurality of volumes, providing more weight to reads to the volume than writes to the volume.

8. A computer program product for improving cache hit ratios for selected volumes within a storage system, the computer program product comprising a non-transitory computer-readable storage medium having computer-usable program code embodied therein, the computer-usable program code configured to perform the following when executed by at least one processor:
    monitor I/O to a plurality of volumes residing on a storage system, the storage system comprising a cache;
    determine, from the I/O, which particular volumes of the plurality of volumes would benefit the most if provided favored status in the cache, the favored status providing increased residency time in the cache compared to volumes not having the favored status;
    generate, by a host system, a list of the particular volumes that have the favored status in the cache and transmitting the list from the host system to the storage system; and
    provide, by the storage system, increased residency time to the particular volumes in the list in accordance with their favored status.

9. The computer program product of claim 8, wherein the computer-usable program code is further configured to maintain the favored status of the particular volumes until an instruction is received to remove their favored status.

10. The computer program product of claim 8, wherein the computer-usable program code is further configured to periodically update the list of particular volumes and transmit the updated list to the storage system.

11. The computer program product of claim 10, wherein the computer-usable program code is further configured to remove the favored status for any volumes not contained in the updated list.

12. The computer program product of claim 8, wherein monitoring the I/O comprises monitoring, for each volume of the plurality of volumes, at least one of the following: (1) a number of accesses to the volume for reads made inside the context of transactions; (2) a number of accesses to the volume for writes made inside the context of transactions; (3) a number of accesses to the volume for reads made outside the context of transactions; and (4) a number of accesses to the volume for writes made outside the context of transactions.

13. The computer program product of claim 12, wherein the computer-usable program code is further configured to, when determining the favored status for each volume of the plurality of volumes, provide more weight to accesses to the volume made inside the context of transactions than accesses to the volume made outside the context of transactions.

14. The computer program product of claim 12, further comprising, when determining the favored status for each volume of the plurality of volumes, provide more weight to reads to the volume than writes to the volume.

15. A system for improving cache hit ratios for selected volumes within a storage system, the system comprising:
    at least one processor;
    at least one memory device operably coupled to the at least one processor and storing instructions for execution on the at least one processor, the instructions causing the at least one processor to:
        monitor I/O to a plurality of volumes residing on a storage system, the storage system comprising a cache;
        determine, from the I/O, which particular volumes of the plurality of volumes would benefit the most if provided favored status in the cache, the favored status providing increased residency time in the cache compared to volumes not having the favored status;
        generate, by a host system, a list of the particular volumes that have the favored status in the cache and transmitting the list from the host system to the storage system; and provide, by the storage system, increased residency time to the particular volumes in the list in accordance with their favored status.

16. The system of claim 15, wherein the computer-usable program code is further configured to maintain the favored status of the particular volumes until an instruction is received to remove their favored status.

17. The system of claim 15, wherein the computer-usable program code is further configured to periodically update the list of particular volumes and transmit the updated list to the storage system.

18. The system of claim 17, wherein the computer-usable program code is further configured to remove the favored status for any volumes not contained in the updated list.

19. The system of claim 15, wherein monitoring the I/O comprises monitoring, for each volume of the plurality of volumes, at least one of the following: (1) a number of accesses to the volume for reads made inside the context of transactions; (2) a number of accesses to the volume for writes made inside the context of transactions; (3) a number of accesses to the volume for reads made outside the context of transactions; and (4) a number of accesses to the volume for writes made outside the context of transactions.

20. The system of claim 19, wherein the instructions further cause the at least one processor to, when determining the favored status for each volume of the plurality of volumes:
provide more weight to accesses to the volume made inside the context of transactions than accesses to the volume made outside the context of transactions; and
provide more weight to reads to the volume than writes to the volume.

* * * * *